United States Patent Office 2,821,529
Patented Jan. 28, 1958

2,821,529

PROCESS FOR THE PREPARATION OF LINEAR QUINACRIDONES

William S. Struve, Chatham, N. J., assignor to E. I. du Pont de Nemours and Company, Wilmington, Del., a corporation of Delaware No Drawing. Application July 22, 1955
Serial No. 523,922

11 Claims. (Cl. 260—279)

This invention pertains to dihydro-quinacridones and quinacridones.

It is an object of this invention to provide a novel process for preparing a new and useful class of compounds known as dihydro-quinacridones. It is a further object to provide a novel process for preparing quinacridones in high yields by the oxidation of dihydro-quinacridone.

It has now been found that quinacridone and derivatives thereof can be obtained in excellent yield and purity by direct cyclization of a dialkyl 2,5-diarylamino-3,6-dihydro-terephthalate to dihydro-quinacridones having the following basic structure:

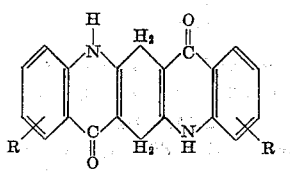

where R may be hydrogen, halogen, alkyl or alkoxy containing from 1–4 carbon atoms.

Chemical analysis confirms the composition of these products and indicates the correctness of the structure which has been assigned to them. For example, the following table is the calculated and the determined analysis for 6,13-dihydro-quinacridone.

| Analysis | Found | Calculated |
|---|---|---|
| Percent C | 76.1 | 76.4 |
| Percent H | 4.7 | 4.46 |
| Percent N | 9.1 | 8.92 |

Further evidence for the given structure is supplied by the reaction which the dihydro ester is considered to undergo.

*Equation 1*

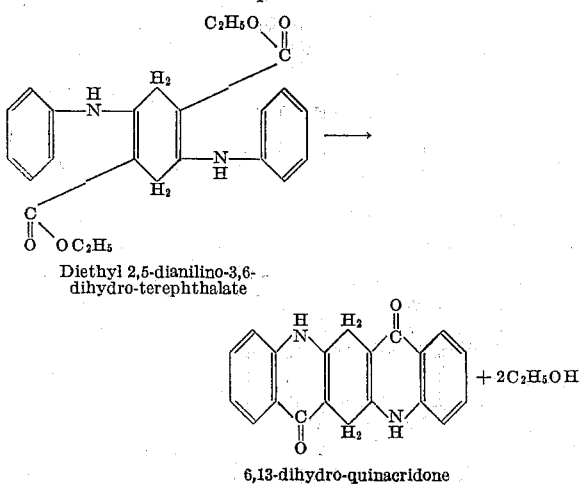

The dihydro-quinacridones thus obtained may then be readily oxidized through the use of mild oxidizing agents to remove two hydrogen atoms thereby converting the slightly colored compound to the highly colored quinacridones.

To consider the process in more detail, cyclization to 6,13-dihydro-quinacridone is accomplished by heating a dialkyl 2,5-diarylamino-3,6-dihydro-terephthalate containing from 1–3 carbon atoms in the alkyl group in an inert, high boiling liquid or heat transfer medium. The heating is carried out in the absence of oxygen at temperatures in the range of 225°–300° C. for a period ranging from ¾ of an hour to 3 hours.

In the preferred embodiment of this invention, aniline is employed as the amine in the initial condensation, and the product resulting from the cyclization is 6,13-dihydro-quinacridone which is a light colored substance of a pale salmon or tan shade. It is insoluble in aqueous alkali even at alkali concentrations of 10–20%. It is also insoluble in alcohol of any dilution, in acetone and in hydrocarbon solvents such as benzene. It can be dissolved in alcohol or dimethyl formamide by the addition of alkali and it is soluble in concentrated sulfuric acid to give a yellowish to reddish brown solution. However, dilution of either of these solutions with water reprecipitates the original dihydro-quinacridone unchanged. The compound does not melt on heating, and it is stable up to about 400° C. though heating in contact with air results in some oxidation to quinacridone with the development of an intense red color.

Cyclization of other 2,5-diarylamino-3,6-dihydroterephthalic acid esters such as those derived from m- and p-chloraniline, o- and p-toluidine and p-anisidine occurs readily by heating the ester in the high boiling, inert liquid or heat transfer medium giving the following substituted dihydro-quinacridones:

3,10-dichloro-6,13-dihydro-quinacridone
2,9-dichloro-6,13-dihydro-quinacridone
4,11-dimethyl-6,13-dihydro-quinacridone
2,9-dimethyl-6,13-dihydro-quinacridone
2,9-dimethoxy-6,13-dihydro-quinacridone These compounds vary in color from light tan to brown. p-Bromoaniline, p-iodoaniline, p-fluoroaniline, p-butylaniline and p-propoxyaniline may be used to form compounds of this invention. Other dialkyl diarylamino-dihydro-terephthalates which may be used to produce their corresponding dihydro-quinacridones include those prepared from ortho, meta, and para mono alkyl and mono alkoxy anilines having up to 4 carbon atoms in the side chain. Examples of these are the diethyl 2,5-diarylamino-3,6-dihydro-terephthalate derived from p-butylaniline and p-butoxyaniline. All of the above compounds are new, and they possess substantially the same properties as those given for the unsubstituted dihydro-quinacridone.

A particularly suitable medium for the cyclization of the dihydro esters to the corresponding dihydro-quinacridone is a mixture of biphenyl and diphenyl oxide. However many other inert, relatively high boiling liquids can also be used as the medium for carrying out the reaction. The principal consideration, aside from inertness, is boiling point. The liquid should have a boiling point above the temperature at which the reaction is to be carried out, yet it should not be so high as to preclude its removal from the reaction mixture by distillation. Examples of suitable materials include α methyl naphthalene, β methyl naphthalene, biphenyl, diphenyl oxide, diethyl phthalate and mineral oils boiling within the range of 225–300° C. as well as mixtures of these materials.

The temperatures at which pyrolysis proceeds most readily are in the range of 250–260° C. Usually about 60 minutes is sufficient to complete the reaction.

These slightly colored quinacridones which have been obtained by the methods described above are easily converted to quinacridones, having high tinctorial value and excellent resistance to acids, alkalis and organic solvents, by a simple oxidation through the use of mild oxidizing agents whereby the removal of two hydrogen atoms occurs with the formation of the colored quinacridones in the manner indicated below:

Equation 2

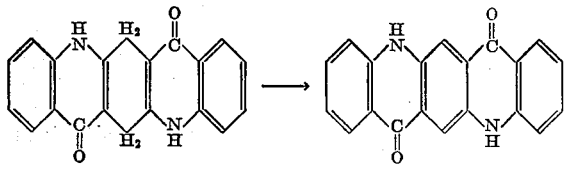

Dihydro-quinacridone pale tan          Quinacridone red

As oxidizing agents such reagents as nitrobenzene m-sodium sulfonate or sodium polysulfide are particularly suitable. The reaction is best carried out by refluxing in mixtures of ethyl alcohol, acetone, or ethylene glycol and water which have been made alkaline with sodium hydroxide. The preferred method is to heat the dihydro-quinacridone in ethylene glycol-water mixture at 118° C. using an excess of nitrobenzene-m-sodium sulphonate and sodium hydroxide. Quinacridone made by this procedure requires no purification. The bright red colored quinacridone is separated by filtration, washed with alcohol and water, then dried and milled by suitable methods to obtain the pigment in proper state of subdivision.

Oxidation of the substituted dihydro-quinacridones, by the methods described, yields a series of colored products varying somewhat in shade but with properties similar to those of the unsubstituted quinacridone red. These are listed below.

| Quinacridone | Color |
| --- | --- |
| 2,10 dichloro | red. |
| 2,9 dichloro | red-violet. |
| 4,11 dimethyl | yellowish red. |
| 2,9 dimethyl | red-violet. |
| 2,9 dimethoxy | Do. |

Examples are given below of the process for the new compositions of matter, namely dihydro-quinacridone and its substituted derivatives and of the processes for converting them to the corresponding quinacridones. These examples are intended to be merely illustrative of the invention and not in limitation thereof.

EXAMPLE 1

10 parts by weight of diethyl 2,5-dianilino-3,6-dihydro-terephthalate is added to 40 parts of a mixture of 23.5% by weight of biphenyl and 76.5% of diphenyl oxide, commercially known as "Dowtherm A," and heated with agitation at 250–257° C. for one hour. It is necessary to protect the ester from oxidation by maintaining an atmosphere of nitrogen gas in the reaction vessel. The charge is cooled nearly to room temperature, and diluted with about 20 parts of denatured ethyl alcohol. The product is then separated by filtering and washing with ethyl alcohol. 6.8 parts of pale tan colored dihydro-quinacridone is obtained which is insoluble in aqueous alkali, alcohol, acetone, and benzene. It dissolves in concentrated sulfuric acid to give a yellowish to brownish solution from which it is reprecipitated unchanged on dilution. It is stable without melting or decomposition at temperatures up to about 400° C. except for a tendency to oxidize to red quinacridone when heated in the air.

EXAMPLE 2

10 parts of diethyl 2,5-di-m-chloranilino-3,6-dihydro-terephthalate is added to 120 parts of "Dowtherm A" and heated in an atmosphere of nitrogen at 250–257° C. for 1½ hours. The charge is cooled and the product isolated as in Example 1. 6.3 parts of dull pink colored 3,10-dichloro-6,13-dihydro-quinacridone is obtained, the properties of which are substantially the same as those described for unsubstituted dihydro-quinacridone of Example 1.

Other derivatives prepared by the method of Example 2 and having similar properties except for differences in color are tabulated below:

| Example | Dihydro Ester Used | Dihydro-Quinacridone Obtained | Color | Yield, parts |
| --- | --- | --- | --- | --- |
| 3 | 2,5-di-p-chloranilino | 2,9-dichloro | salmon | 7.3 |
| 4 | 2,5-di-o-toluidino | 4,11-dimethyl | pink | 7.5 |
| 5 | 2,5-di-p-toluidino | 2,9-dimethyl | brown | 5.5 |
| 6 | 2,5-di-p-anisidino | 2,9-dimethoxy | brown | 6.8 |

EXAMPLE 7

10 parts of diethyl 2,5-dianilino-3,6-dihydro-terephthalate is added to 40 parts of biphenyl, heated to about 90° C. The mixture is then heated to 250° C. and stirred for 1½ hours in an atmosphere of nitrogen gas. After cooling to about 120° C. the charge is diluted with some xylene and transferred to a flask equipped for steam distillation. The xylene and biphenyl are distilled off with steam and the product is filtered and dried. 5 parts of brown colored 6,13-dihydro-quinacridone is obtained.

EXAMPLE 8

10 parts of diethyl 2,5-dianilino-3,6-dihydro-terephthalate and 40 parts of diethyl phthalate are heated to 260° C. for 1 hour in an atmosphere of nitrogen. The charge is cooled, diluted with alcohol, filtered and washed with alcohol. 5.5 parts of pink colored dihydro-quinacridone is isolated.

The following examples are illustrative of the oxidation of dihydro-quinacridone to quinacridone.

EXAMPLE 9

10 parts by weight of 6,13-dihydro-quinacridone (such as was produced in Example 1),
200 parts of denatured alcohol (formula 2β ethyl alcohol with 0.5% benzene),
25 parts of water,
20 parts of nitrobenzene-m-sodium sulphonate,
4 parts of sodium hydroxide 100% (as 20% solution)

is charged to a flask and heated at reflux for 2 hours. After cooling somewhat, the product is filtered off, washed with hot alcohol and then with hot water until alkali free, and dried. 9.6 parts of bright red quinacridone is obtained.

Other quinacridones which can be made by the method of Example 9 are shown in the following table:

| Example | Dihydro-Quinacridone Used | Quinacridone Obtained | Color | Yield, parts |
| --- | --- | --- | --- | --- |
| 10 | From Example 2 | 3,10 dichloro | red | 4.6 |
| 11 | From Example 3 | 2,9 dichloro | red-violet | 9.2 |
| 12 | From Example 4 | 4,11 dimethyl | yellow-red | 8.8 |
| 13 | From Example 5 | 2,9 dimethyl | red-violet | 9.5 |
| 14 | From Example 6 | 2,9 dimethoxy | red-violet | 9.7 |

EXAMPLE 15

10 parts of 6,13-dihydro-quinacridone
100 parts ethylene glycol
30 parts water
4 parts sodium hydroxide 100% (as 20% solution)
20 parts nitrobenzene-m-sodium sulphonate are charged to a flask and heated at 118–120° C. for 2 hours. The charge is cooled, and the product isolated as in Example 9. 9.7 parts of quinacridone is obtained.

Diethyl dianilino-dihydro-terephthalate, used as the starting material in the preferred embodiment of this invention is a known compound which can be prepared from commercial raw materials. As an illustration of an improved and convenient method for preparing this ester, one may start with the readily available diethyl succinate which readily reacts in a "Dowtherm" suspension with sodium ethylate to give diethyl succinyl succinate. After neutralization with NaHCO₃ in the presence of water and the subsequent separation of the aqueous layer, aniline is added in considerable excess together with a small amount of aniline hydrochloride which serves as a catalyst for the condensation reaction. The mixture is then heated under vacuum, with simultaneous removal of the water formed, followed by neutralization of the aniline hydrochloride with a water solution of sodium carbonate. The excess aniline is then removed by distillation under vacuum, the vacuum finally released by the introduction of nitrogen gas and the charge cooled to give the suspension of diethyl dianilino-dihydro-terephthalate which is the starting material in Example 1 above. It is emphasized, however, that the above steps are illustrative only, and it is not intended to limit this invention to any particular method of preparation of the dialkyl dianilino-dihydro-terephthalate. The process described above is the subject matter of my co-pending application, Serial No. 523,921, filed July 22, 1955.

It has been noted above that many different agents can be used in the oxidation step wherein the dihydro-quinacridone is converted to the colored quinacridone, and that this reaction can be carried out in various aqueous solutions of organic solvents, usually of an alcoholic nature. In general, it is preferred that the reaction be carried out under alkaline conditions, but the choice of solvent and the choice of agent is not critical. It is also possible to carry out the oxidation by simply stirring while bubbling air through the mixture in which the quinacridone is produced, or a suitable oxidizing mixture may be introduced at this point. Oxidation is evident from the marked change in color which accompanies the reaction.

Preferably, the dihydro-quinacridone is isolated prior to oxidation. The isolation of the dihydro-quinacridone, and the isolation of the finished quinacridone follow conventional procedures which do not involve any critical steps. Thus, the dihydro-quinacridone may be separated from the inert liquid by filtration followed by washing with alcohol and subsequent drying. As an alternative procedure, the liquid may be removed by steam distillation yielding an aqueous slurry from which the solid is removed by filtration and dried at elevated temperature in a conventional manner. In like manner, the quinacridone produced by the oxidation reaction can be removed from the liquid by filtration, washing and drying in a conventional manner.

While the examples have been concerned with diethyl 2,5-diarylamino-3,6-dihydro-terephthalate as the starting material in the cyclization reaction, it should be understood that the corresponding methyl and propyl terephthalate esters can be used in this process. The reaction would proceed in much the same manner as shown in Equation 1 except that methyl or propyl alcohol would be the by-product. The process of this invention is considered to be unique in that two anilino groups and two carboxy groups attached to the same aromatic nucleus are undergoing cyclization at the same time thereby forming two new cyclic rings on the same cyclic nucleus. Furthermore, the present invention makes this double cyclization possible without side reactions and the formation of impurities.

The quinacridones resulting from the processes of this invention are useful for preparing pigments of great value showing a very high resistance to fading on exposure to the elements, and exhibiting complete insolubility in the usual solvents of coating compositions. These pigments are also insoluble in the ordinary acids and alkalis to which compositions made from these pigments might be exposed. Furthermore, they yield pigments of highly attractive colors in hues ranging from bluish red to violet. Heretofore, pigments in this color range have shown a notable lack of the high lightfastness and durability possessed by the products of this invention.

I claim:

1. A process for preparing a quinacridone which comprises heating under non-oxidizing conditions a dialkyl 2,5 - diarylamino - 3,6 - dihydro - terephthalate, having from 1–3 carbon atoms in the alkyl groups, in an inert, high boiling liquid at temperatures ranging from about 225–300° C. thereby obtaining a dihydro-quinacridone, separating said dihydro-quinacridone from the reaction mixture, and oxidizing the latter compound with a mild oxidizing agent to a quinacridone, said oxidizing agent being selected from the group consisting of nitrobenzene-m-sodium sulfonate, sodium polysulfide and oxygen.

2. The process of claim 1 in which the dialkyl 2,5-diarylamino-3,6-dihydro-terephthalate is diethyl 2,5-dianilino-3,6-dihydro-terephthalate.

3. A process for preparing a quinacridone which comprises heating under non-oxidizing conditions a dialkyl 2,5-diarylamino-3,6-dihydro-terephthalate, having from 1–3 carbon atoms in the alkyl groups, in a mixture of biphenyl and diphenyl oxide at temperatures ranging from about 250° C.–260° C. thereby obtaining a dihydro-quinacridone, separating said dihydro-quinacridone from the reaction mixture, and then oxidizing the latter compound with a mild oxidizing agent to a quinacridone, said oxidizing agent being selected from the group consisting of nitrobenzene-m-sodium sulfonate, sodium polysulfide and oxygen.

4. The process of claim 3 in which the dialkyl 2,5-diarylamino-3,6-dihydro-terephthalate is diethyl 2,5-dianilino-3,6-dihydro-terephthalate.

5. The process of claim 3 in which the dialkyl 2,5-diarylamino-3,6-dihydro-terephthalate is a diethyl 2,5-dichloroanilino-3,6-dihydro-terephthalate.

6. The process of claim 3 in which the dialkyl 2,5-diarylamino-3,6-dihydro-terephthalate is a diethyl 2,5-ditoluidino-3,6-dihydro-terephthalate.

7. The process of claim 3 in which the dialkyl 2,5-diarylamino-3,6-dihydro-terephthalate is a diethyl 2,5-dianisidino-3,6-dihydro-terephthalate.

8. A process for preparing a dihydro-quinacridone which comprises heating under non-oxidizing conditions a dialkyl 2,5-diarylamino-3,6-dihydro-terephthalate, having from 1–3 carbon atoms in the alkyl groups, in an inert, high boiling liquid at temperatures ranging from about 225–300° C. and recovering said dihydro-quinacridone.

9. A process for producing a quinacridone which comprises oxidizing a dihydro-quinacridone with a mild oxidizing agent, said oxidizing agent being selected from the group consisting of nitrobenzene-m-sodium sulfonate, sodium polysulfide and oxygen.

10. A process for producing quinacridone which comprises oxidizing a dihydro-quinacridone in an alkaline solution with a mild oxidizing agent selected from the group consisting of nitrobenzene-m-sodium sulfonate, sodium polysulfide and oxygen and recovering quinacridone.

11. A process for preparing a quinacridone which comprises heating under non-oxidizing conditions a dialkyl 2,5-diarylamino-3,6-dihydro-terephthalate, having from 1–3 carbon atoms in the alkyl groups, in an inert, high boiling liquid at temperatures ranging from about 225–300° C. thereby obtaining a dihydro-quinacridone, and oxidizing the latter compound with a mild oxidizing agent to a quinacridone, said oxidizing agent being selected from the group consisting of nitrobenzene-m-sodium sulfonate, sodium polysulfide and oxygen.

References Cited in the file of this patent

UNITED STATES PATENTS 2,054,100  Scott et al. _____ Sept. 15, 1936

OTHER REFERENCES

Liebermann et al.: Annalen, vol. 518, pages 245–259 (1935).